(12) United States Patent
Siegel et al.

(10) Patent No.: US 8,921,717 B2
(45) Date of Patent: Dec. 30, 2014

(54) WEIGHT MAGNITUDE AND WEIGHT POSITION INDICATION SYSTEMS AND METHODS

(71) Applicants: Vernon H. Siegel, Clarence, NY (US); Donald J. Siegel, East Amherst, NY (US)

(72) Inventors: Vernon H. Siegel, Clarence, NY (US); Donald J. Siegel, East Amherst, NY (US)

(73) Assignee: S R Instruments, Inc., Tonawanda, NY (US)

( * ) Notice: Subject to any disclaimer, the term of this patent is extended or adjusted under 35 U.S.C. 154(b) by 317 days.

(21) Appl. No.: 13/668,841

(22) Filed: Nov. 5, 2012

(65) Prior Publication Data

US 2014/0124272 A1    May 8, 2014

(51) Int. Cl.
| | |
|---|---|
| *G01M 1/12* | (2006.01) |
| *G01G 19/00* | (2006.01) |
| *G01G 19/44* | (2006.01) |
| *G01G 19/52* | (2006.01) |
| *G01G 23/18* | (2006.01) |
| *G01G 19/12* | (2006.01) |

(52) U.S. Cl.
CPC .............. *G01G 23/18* (2013.01); *G01G 19/445* (2013.01); *G01M 1/122* (2013.01); *G01G 19/12* (2013.01)
USPC ........... 177/144; 73/65.01; 177/200; 340/666

(58) Field of Classification Search
USPC ........... 73/65.01; 177/199, 200, 144; 340/666
See application file for complete search history.

(56) References Cited

U.S. PATENT DOCUMENTS

| | | |
|---|---|---|
| 3,961,201 A | 6/1976 | Rosenthal |
| 4,534,077 A | 8/1985 | Martin |
| 4,539,560 A | 9/1985 | Fleck et al. |
| 4,724,554 A | 2/1988 | Kowalski et al. |
| 4,934,468 A | 6/1990 | Koerber, Sr. et al. |
| 4,953,244 A | 9/1990 | Koerber, Sr. et al. |
| 5,075,523 A | 12/1991 | Ford |
| 5,276,432 A * | 1/1994 | Travis ..................... 340/573.4 |
| 5,906,016 A | 5/1999 | Ferrand et al. |
| 6,208,250 B1 | 3/2001 | Dixon et al. |
| 6,438,776 B2 | 8/2002 | Ferrand et al. |
| 6,727,445 B2 | 4/2004 | Cullinan et al. |
| 6,788,206 B1 | 9/2004 | Edwards |
| 6,847,301 B1 | 1/2005 | Olson |
| 6,969,809 B2 | 11/2005 | Rainey |

(Continued)

FOREIGN PATENT DOCUMENTS

| | | |
|---|---|---|
| EP | 0368856 | 5/1990 |
| EP | 2286782 | 2/2011 |
| WO | WO2007058578 | 5/2007 |
| WO | WO2008139500 | 11/2008 |

*Primary Examiner* — Randy W Gibson
(74) *Attorney, Agent, or Firm* — Jaeckle Fleischmann & Mugel, LLP

(57) ABSTRACT

The disclosed systems and methods allow the weight and relative position of an object on a weighing surface to be simultaneously determined using a circuit that does not require pre-programmed tables and that can be used in an analog or digital environment. One example system includes first, second, third, and fourth load cells having respective first, second, third, and fourth strain gauges. The strain gauges are configured to measure strain at the load cells caused by the object on the weighing surface. The system also includes circuitry configured to simultaneously determine weight and position of the object on the weighing surface, and a display that reports the weight of the object, a longitudinal position of the object, and a lateral position of the object.

18 Claims, 14 Drawing Sheets

(56) References Cited

U.S. PATENT DOCUMENTS

| | | |
|---|---|---|
| 7,002,482 B2 | 2/2006 | Callaway |
| 7,126,065 B2 * | 10/2006 | Petrucelli ................... 177/25.13 |
| 7,253,366 B2 | 8/2007 | Bhai |
| 7,437,787 B2 | 10/2008 | Bhai |
| 7,500,280 B2 | 3/2009 | Dixon et al. |
| 7,834,768 B2 | 11/2010 | Dixon et al. |
| 7,978,084 B2 | 7/2011 | Dixon et al. |
| 8,048,005 B2 | 11/2011 | Dixon et al. |
| 2002/0082206 A1 | 6/2002 | Leach et al. |
| 2004/0163855 A1 * | 8/2004 | Carlucci ...................... 177/200 |
| 2007/0268147 A1 | 11/2007 | Bhai |
| 2008/0184491 A1 | 8/2008 | Kemper |
| 2013/0081451 A1 * | 4/2013 | Kamada et al. .............. 73/65.01 |

* cited by examiner

WEIGHT MAGNITUDE AND WEIGHT POSITION INDICATION SYSTEMS AND METHODS

BACKGROUND OF THE INVENTION

It is sometimes necessary to know not only the weight of an object but also the relative position of the center of gravity of the object on a particular surface. For example, it would be desirable to know the position of the center of gravity of a load in a truck to alert a driver if a shift of the mass in a truck during transport creates a risk of the truck tipping when traveling around corners. It would also be desirable to know the relative location of the center of gravity of an object on a conveyer system to ensure that the object is centered for processing or packaging or is at risk of falling off the conveyor without visual monitoring. It is also desirable to know the relative position or shift of position of a patient in a hospital bed. Patients are often unable to be cognizant of their location relative to the edge of a hospital bed. In these instances, it is desirable to know when the patient approaches the edge of a bed to alert a nearby caregiver that the patient is in danger of falling off the bed. Some prior patents have attempted to address this problem in different ways.

U.S. Pat. No. 5,276,432 to Travis ("Travis") discloses that a patient's weight is determined by locating four force cells in a supporting relation at the corners of the patient's bed. First, the bed is tared by measuring the bed weight from the summed output of the four force cells. Then, the weight from each of the four load cells is measured with the patient in place and the tare value is subtracted to obtain a net patient weight. Then, a center of gravity is calculated from one particular load cell. From this point of reference, the position of the patient can be calculated. To estimate the position, all load cell measurements are needed. The data must be fed into a multi-purpose computer and processed. Thus, an instantaneous position indication is not possible with this system. Moreover, the patient's position can only be estimated when the patient is in the region defined by the four corners of the bed.

U.S. Pat. No. 7,253,366 to Bhai ("Bhai") uses four load cells located at the corners of the bed. The signals from the load cells are summed and the bed tare is subtracted to indicate the patient's weight. From a series of prior calibration measurements, a table of data is stored. The measurements are compared to the lookup table and stored, and a variation of the patient's weight from the preset table is used to indicate a change in position. Again, a multi-purpose computer is required to perform a variety of calculations.

SUMMARY OF THE INVENTION

Despite the above prior approaches, there exists a need to determine the weight and relative position of an object on a weighing surface simultaneously using a circuit that does not require pre-programmed tables and that can be used in an analog or digital environment. One or more embodiments of the present invention address these and other needs by providing a different approach that involves a method that provides instantaneous weight and weight position relative to a neutral plane and that may be used to provide an alarm whenever the weight distribution approaches a preset boundary.

One example embodiment of the present invention is a system for determining weight and position of an object on a weighing surface. The system includes first, second, third, and fourth load cells having respective first, second, third, and fourth strain gauges. The strain gauges are configured to measure strain at the load cells caused by the object on the weighing surface. The system also includes circuitry configured to simultaneously determine weight and position of the object on the weighing surface. The circuitry determines the weight and position by obtaining a first electrical signal produced by the first strain gauge, a second electrical signal produced by the second strain gauge, a third electrical signal produced by the third strain gauge, and a fourth electrical signal produced by the fourth strain gauge. The circuitry simultaneously adds the first electrical signal, the second electrical signal, the third electrical signal, and the fourth electrical signal, to produce a sum electrical signal proportional to a total weight on the load cells, and subtracts from the sum electrical signal a tare value proportional to the total weight of the weighing surface to produce a tared electrical signal. The circuitry further simultaneously subtracts a sum of the third electrical signal and the fourth electrical signal from a sum of the first electrical signal and the second electrical signal to determine a longitudinal value indicative of the position of a center of gravity of the object on the weighing surface relative to the locations of the first and third load cells and relative to the locations of the second and fourth load cells. The circuitry further simultaneously subtracts a sum of the second electrical signal and the fourth electrical signal from a sum of the first electrical signal and the third electrical signal to determine a lateral value indicative of the position of a center of gravity of the object on the weighing surface relative to the locations of the first and second load cells and relative to the locations of the third and fourth load cells. The system also includes a display that reports the weight of the object based on the tared electrical signal, a longitudinal position of the object based on the determined longitudinal value, and a lateral position of the object based on the determined lateral value.

In many embodiments, the weighing surface is a hospital bed and the object is a patient. Some embodiments also include an alarm configured to indicate if the object shifts to an unwanted position. In such embodiments, the alarm may be triggered to indicate by comparing the determined longitudinal value to a longitudinal alarm value to determine whether the determined longitudinal value exceeds the longitudinal alarm value, where the longitudinal alarm value is indicative of the object shifting to a an unwanted position. The alarm may also, or in the alternative, be triggered to indicate by comparing the determined lateral value to a lateral alarm value to determine whether the determined lateral value exceeds the lateral alarm value, where the lateral alarm value is indicative of the object shifting to a an unwanted position. In some embodiments the circuitry is further configured to normalize the longitudinal value by linearly reducing longitudinal value by the absolute value of tared electrical signal. The circuitry may also, or in the alternative, be further configured to normalize the lateral value by linearly reducing lateral value by the absolute value of tared electrical signal.

Another example embodiment of the present invention is method of determining weight and position of an object on a weighing surface, where the weighing surface has first, second, third, and fourth load cells with respective first, second, third, and fourth strain gauges, and where the strain gauges are configured to measure strain at the load cells caused by the object on the weighing surface. The method involves simultaneously adding a first electrical signal produced by the first strain gauge, a second electrical signal produced by the second strain gauge, a third electrical signal produced by the third strain gauge, and a fourth electrical signal produced by the fourth strain gauge, to produce a sum electrical signal proportional to a total weight on the load cells, and subtracting from the sum electrical signal a tare value proportional to the total weight of the weighing surface to produce a tared electrical signal. The method further involves simultaneously subtracting a sum of the third electrical signal and the fourth electrical signal from a sum of the first electrical signal and the second electrical signal to determine a longitudinal value indicative of the position of a center of gravity of the object on the weighing surface relative to the locations of the first and third load cells and relative to the locations of the second and fourth load cells. The method further involves simultaneously subtracting a sum of the second electrical signal and the fourth electrical signal from a sum of the first electrical signal and the third electrical signal to determine a lateral value indicative of the position of a center of gravity of the object on the weighing surface relative to the locations of the first and second load cells and relative to the locations of the third and fourth load cells. The method further involves displaying a weight of the object based on the tared electrical signal, displaying a longitudinal position of the object based on the determined longitudinal value, and displaying a lateral position of the object based on the determined lateral value.

Yet another example embodiment of the present invention is a system for determining weight and position of an object on a weighing surface. The system includes first and second load cells having respective first and second strain gauges. The strain gauges are configured to measure strain at the load cells caused by the object on the weighing surface. The system also includes circuitry configured to simultaneously determine weight and position of the object on the weighing surface. The circuitry determines the weight and position by obtaining a first electrical signal produced by the first strain gauge, and a second electrical signal produced by the second strain gauge. The circuitry simultaneously adds the first electrical signal and the second electrical signal to produce a sum electrical signal proportional to a total weight on the load cells, and subtracts from the sum electrical signal a tare value proportional to the total weight of the weighing surface to produce a tared electrical signal. The circuitry further simultaneously subtracts the second electrical signal from the first electrical signal to determine a position value indicative of the position of a center of gravity of the object on the weighing surface relative to the locations of the first and second load cells. The system also includes a display that reports the weight of the object based on the tared electrical signal, and a position of the object based on the determined position value.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
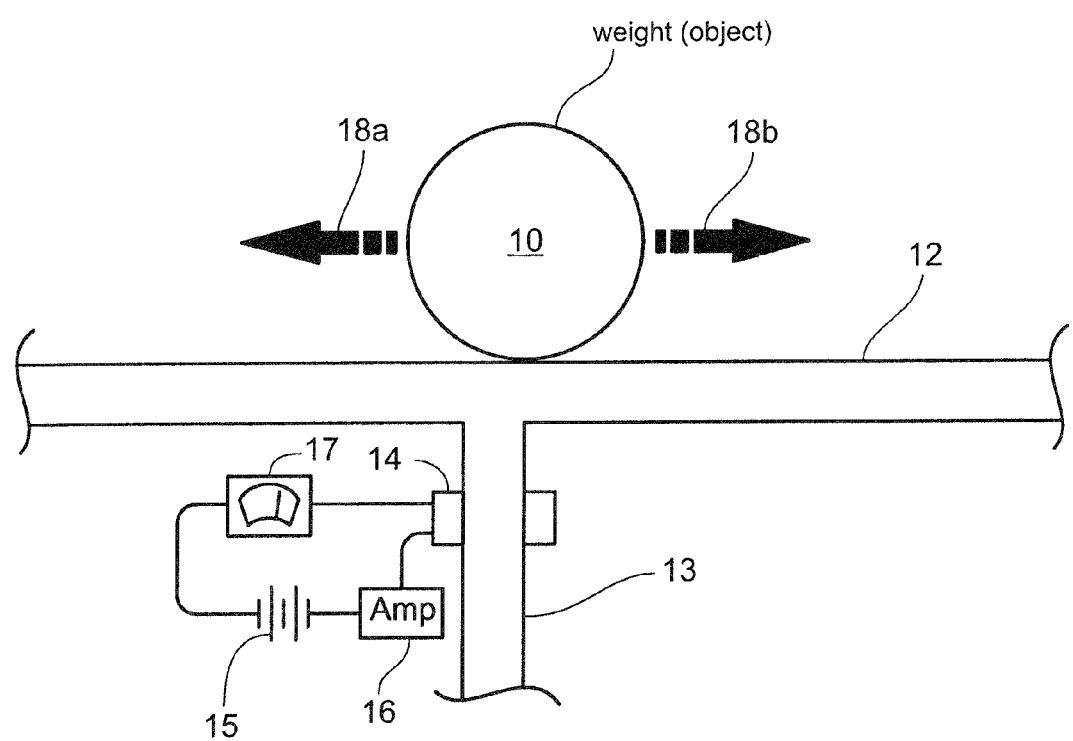
FIG. 1 is a schematic of a mechanism for measuring strain caused by an object on a weighing surface.

Embodiments of the claimed invention can be explained with reference to FIG. 1, showing an object (weight) 10 on a surface 12 supported by a cantilever beam 13 containing a strain gauge 14 that may be connected to a power source 15, amplifying means 16, and output 17. As the force translates across the surface 12 in the direction of arrow 18a, a torque on cantilever beam 13 is produced. This bends the beam 13. The output 17 of the strain gauge circuit 14 will show a responsive reading reflecting the output 17.

Figure 2:
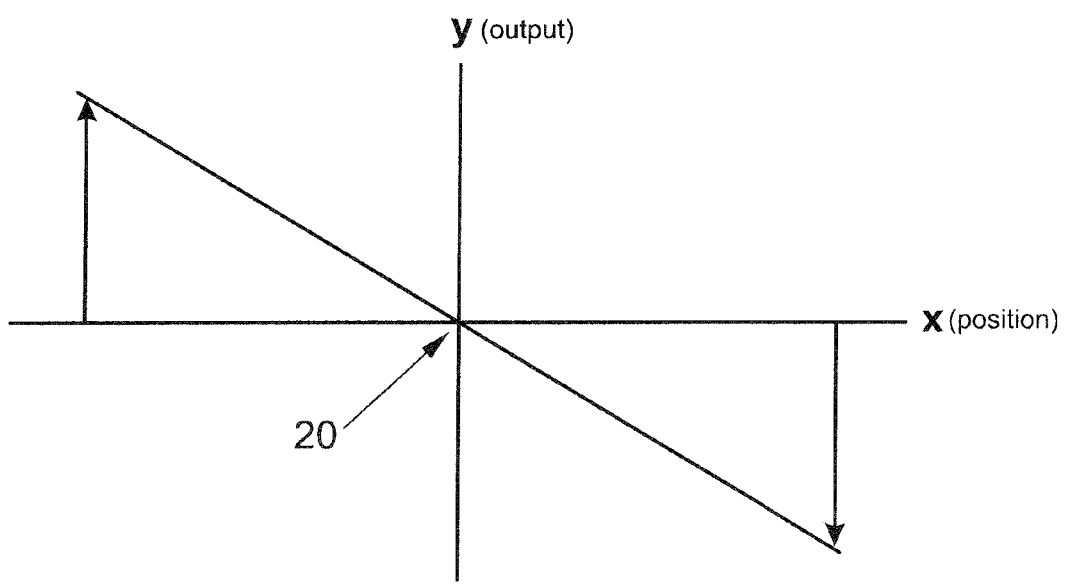
FIG. 2 is a graph of example output of the mechanism of FIG. 1.

FIG. 2 represents an output curve for an object of fixed weight that moves along surface 12 in the directions of arrows 18a and 18b. The torque when the object is centered on the cantilever beam is zero. As the object 10 moves in the direction of arrow 18a, a positive output is observed. The farther the object 10 is moved from the cantilever beam, the greater the output despite the object 10 being constant in mass. As the object 10 moves in the direction of arrow 18b, a negative output that is proportional in magnitude but opposite in charge is observed. The farther the object 10 is moved from the cantilever beam, the greater the negative output despite the object 10 being constant in mass. A zero or neutral point 20 is shown in FIG. 2 representing a position of the center of gravity of the object 10 being positioned over the cantilever beam 13.

Figure 3:
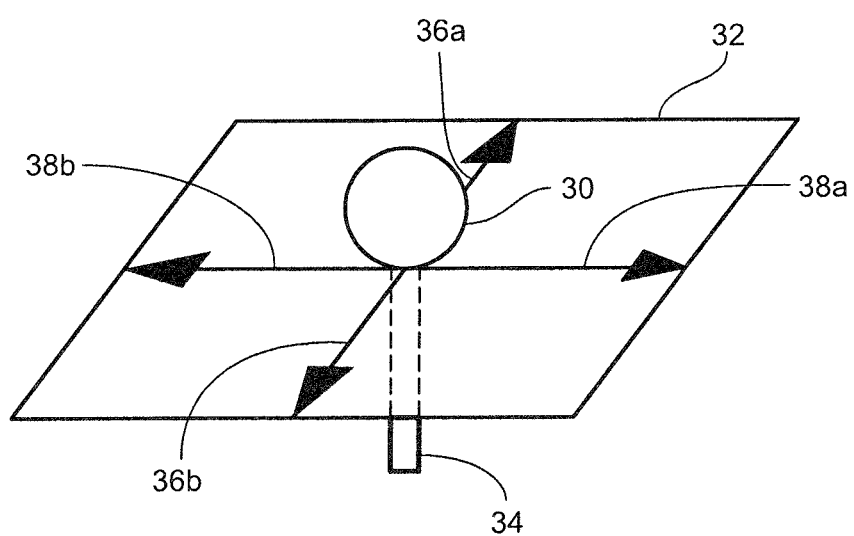
FIG. 3 is a schematic of another mechanism for measuring strain caused by an object on a weighing surface.

This same logic can be applied to an object 30 on a planar surface 32 supported by a cantilever beam 34 as shown in FIG. 3. The cantilever beam can bend in two orthogonal directions. The first direction is represented by arrows 36a and 36b. The second direction is represented by arrows 38a and 38b.

Figure 4:
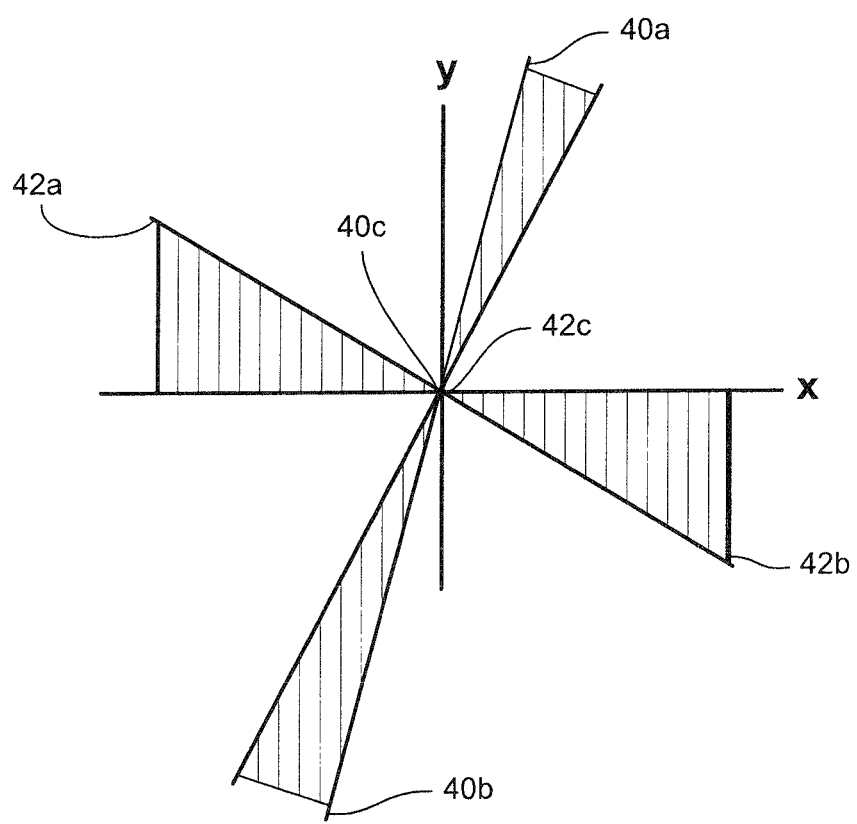
FIG. 4 is a graph of example output of the mechanism of FIG. 3.

As shown in FIG. 4, movement of the object 30 in the direction of arrow 36a will produce a positive output 40a. Movement of the object 30 in the direction of arrow 36b produces a negative output 40b. Centering the object 30 along the line 38a,b produces a zero output 40c. Centering the object 30 along line 36a,b produces a zero output 42c. The position of the object 30 can be calculated and identified relative to the cantilever beam 34. It is the purpose of the claimed invention to simultaneously measure the weight of the object and its location on a surface. One example way to accomplish this is to provide a force transducer (not shown in FIG. 3) supporting the cantilever beam 34 of FIG. 3.

Figure 5A:
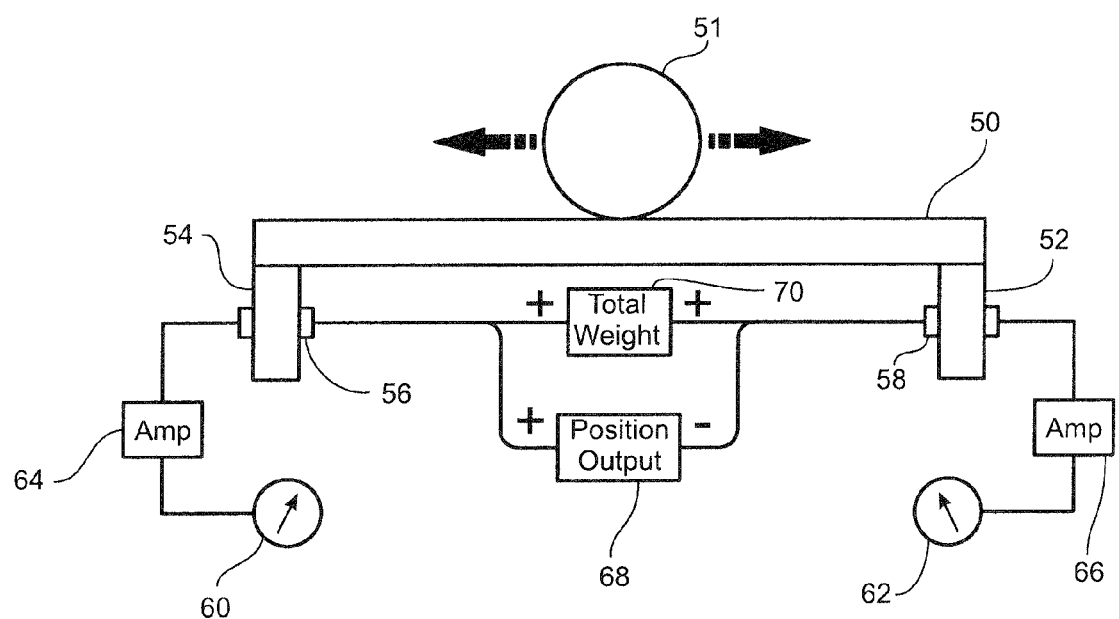
FIG. 5A is a schematic of a system for determining weight and position of an object on a weighing surface, according to an example embodiment of the present invention.
Figure 5B:
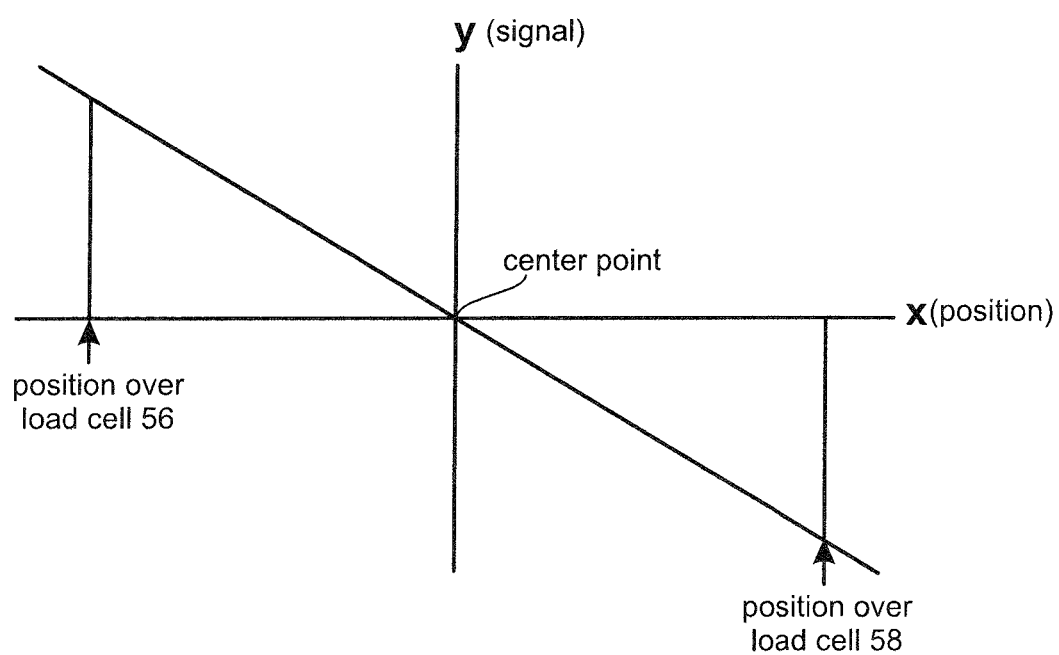
FIG. 5B is a graph of example output of the system of FIG. 5A.

With reference to FIG. 5A, surface 50 is supported by two load cells 52 and 54. The load cell 52 and 54 have respective strain gauges 58 and 56 that are powered by respective power sources 62 and 60 and amplifiers 66 and 64. The output from strain gauges 56 and 58 are added to calculate the total weight 70 and subtracted to determine the relative position 68. The addition of the signals results in a constant reading regardless of the position between load cell 52 and load cell 54. On the other hand, if the signals from strain gauge 56 are subtracted from the signals of strain gauge 58, a curve such as shown in FIG. 5B may be produced. When an object 51 is positioned over load cell 54, the difference between the positive strain gauge reading from 56 and the negative strain gauge reading 58 results in a large positive reading. When the object 51 is positioned equidistant between load cell 52 and load cell 54, the reading on strain gauges 56 and 58 will be equal and their difference is zero. When the object 51 is positioned over the load cell 52 the positive reading from strain gauge 58 can be subtracted from the already negative reading of the strain gauge 56 resulting in a large negative reading. Thus, a curve is observed, as illustrated in FIG. 5B, that is proportional to the relative position of the object 51 along the supporting surface 50.

Figure 6A:
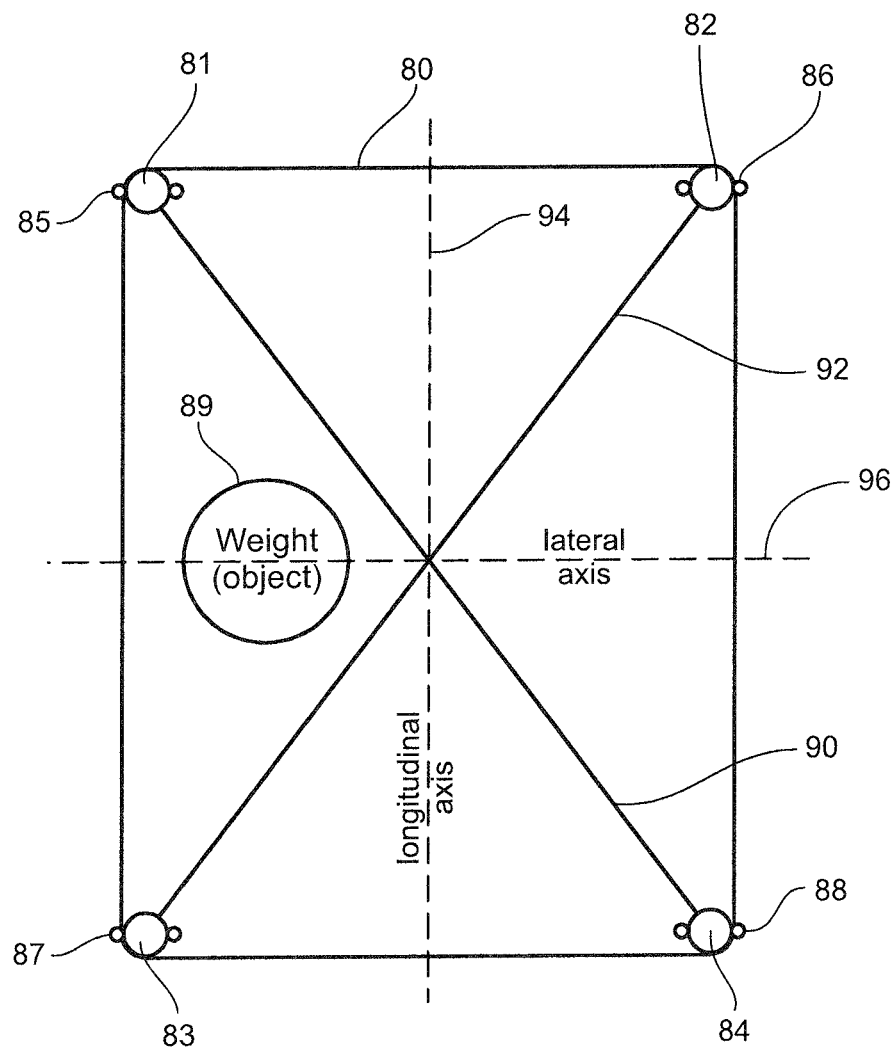
FIG. 6A is a schematic of a system for determining weight and position of an object on a weighing surface, according to an example embodiment of the present invention.

FIG. 6A shows a weighing surface 80, such as a weighing platform or a hospital bed that is supported by four load cells 81, 82, 83 and 84, each with strain gauges 85, 86, 87, and 88 that measure the strain at each of the load cells 81, 82, 83 and 84. If the load cells have similar outputs, object 89 can be positioned at any location on the weighing surface 80. The sum of all the output of all strain gauges 85, 86, 87 and 88 will be relatively constant regardless of where the object 89 is located on the surface 80. However, the difference between the output of strain gauges 85 and 88, for example, can reveal the position of the weight relative to axis 90 extending between load cells 81 and 84. Thus, a signal can be produced for the location of the center of gravity simultaneously with the total weight.

Figure 6C:
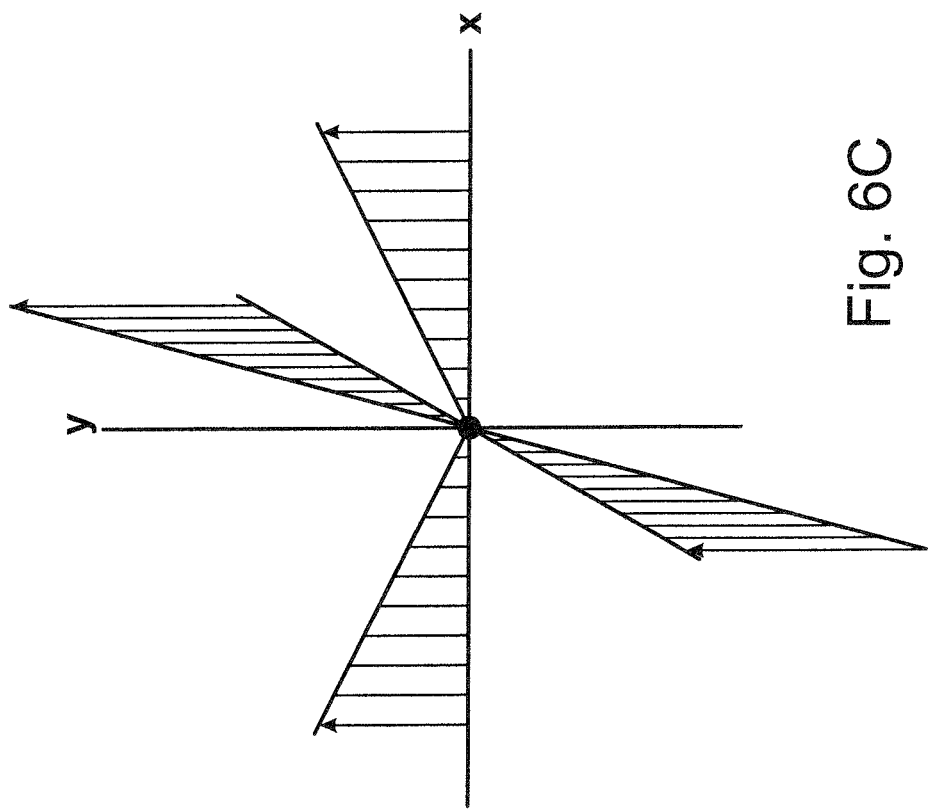
FIG. 6C is a graph of rectified output of the system of FIG. 6A.
Figure 6B:
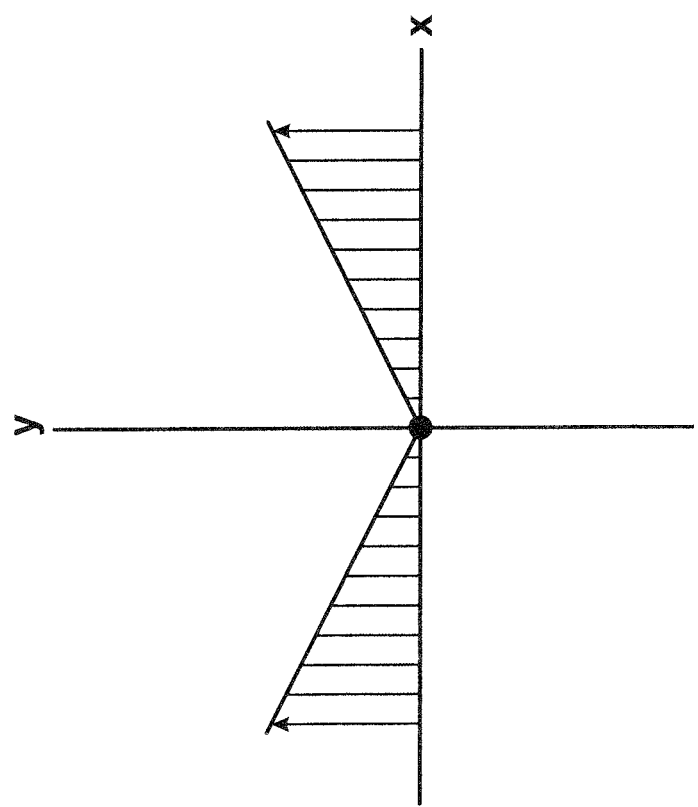
FIG. 6B is a graph of rectified output of the system of FIG. 5A.
Figure 7:
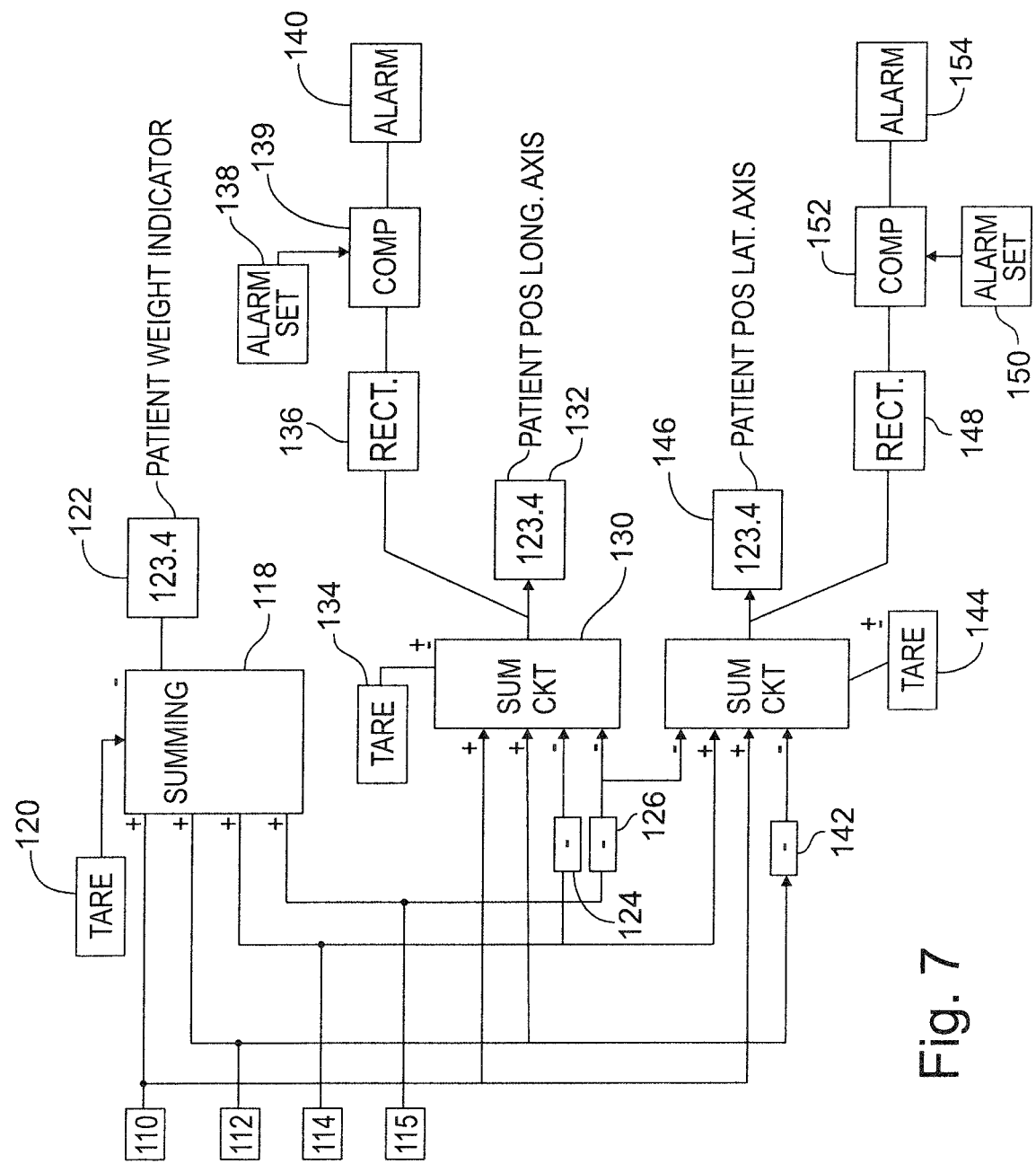
FIG. 7 is an electrical drawing corresponding to the schematic of FIG. 6A.
Figure 8A:
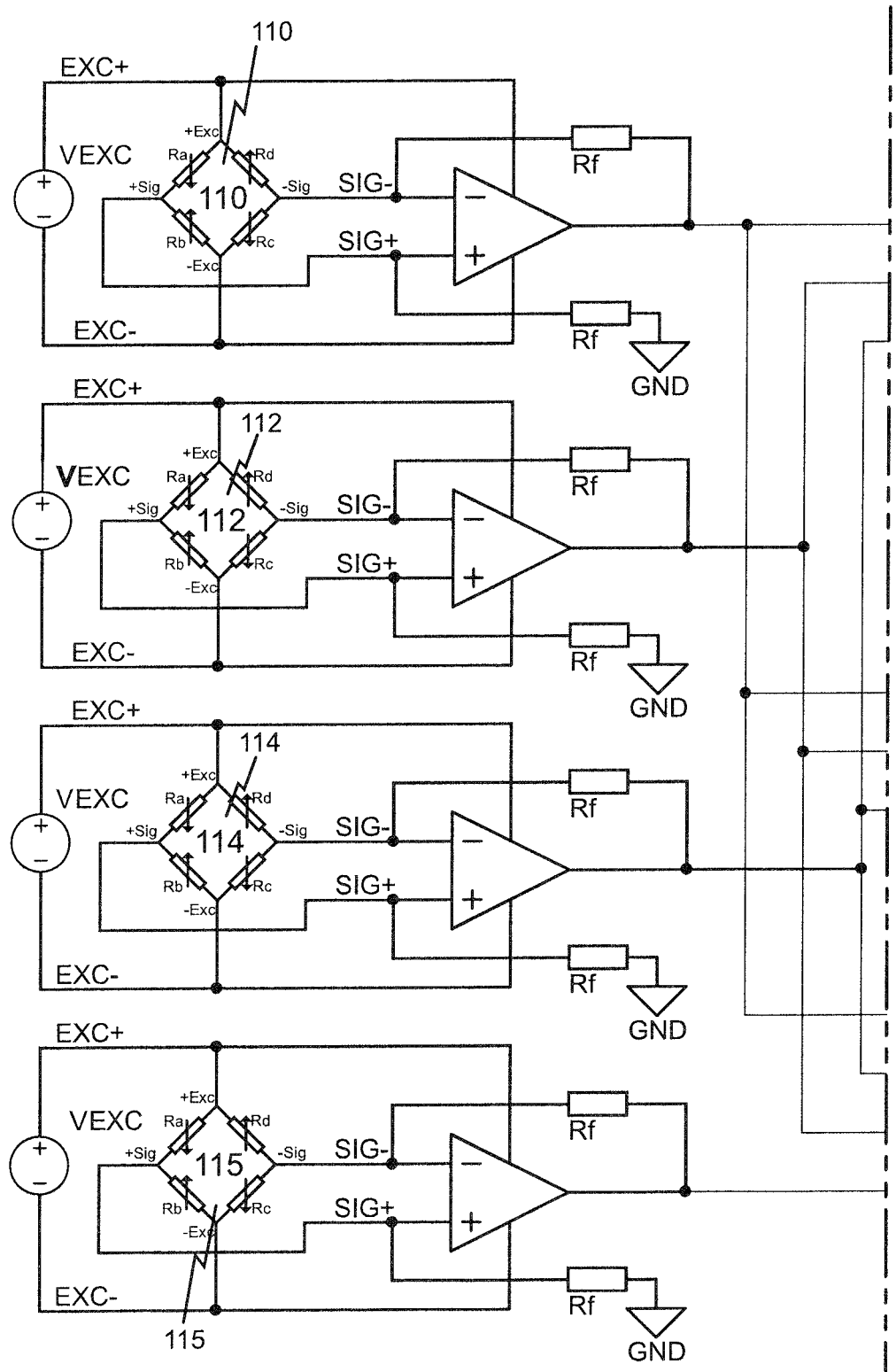
FIGS. 8A-8D are detailed electrical drawings corresponding to the schematic of FIG. 6A.
Figure 8B:
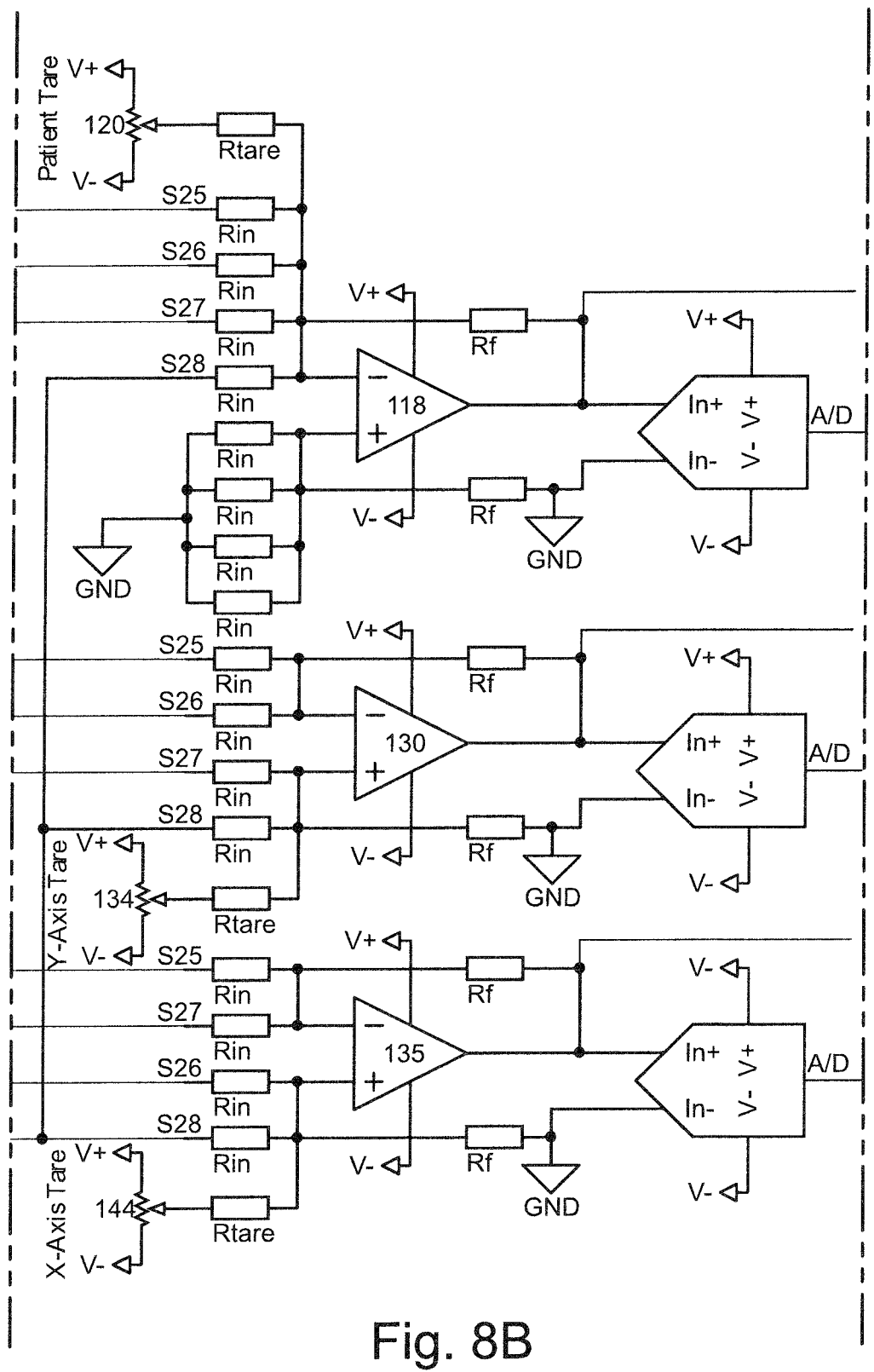
Figure 8C:
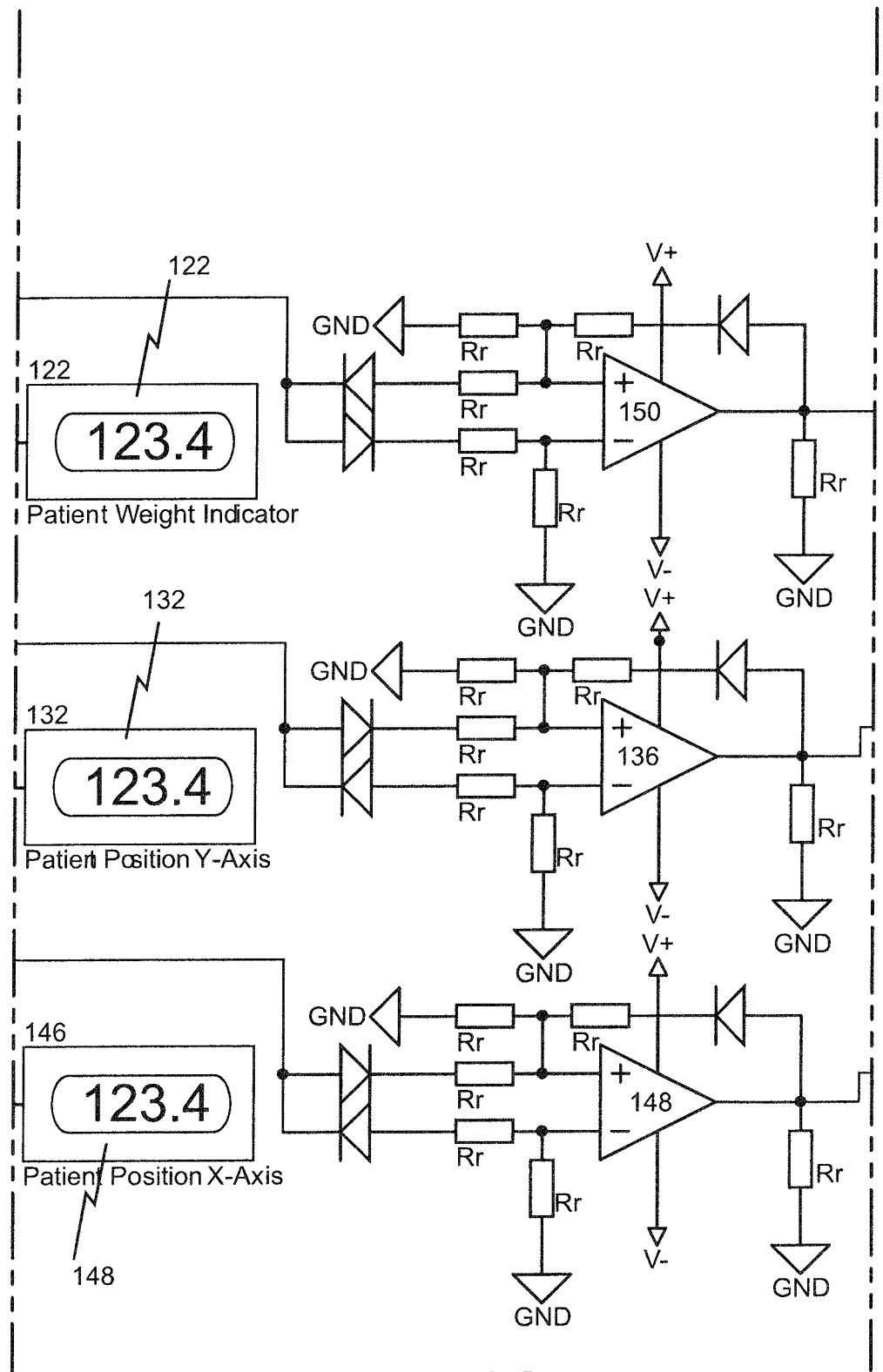
Figure 8D:
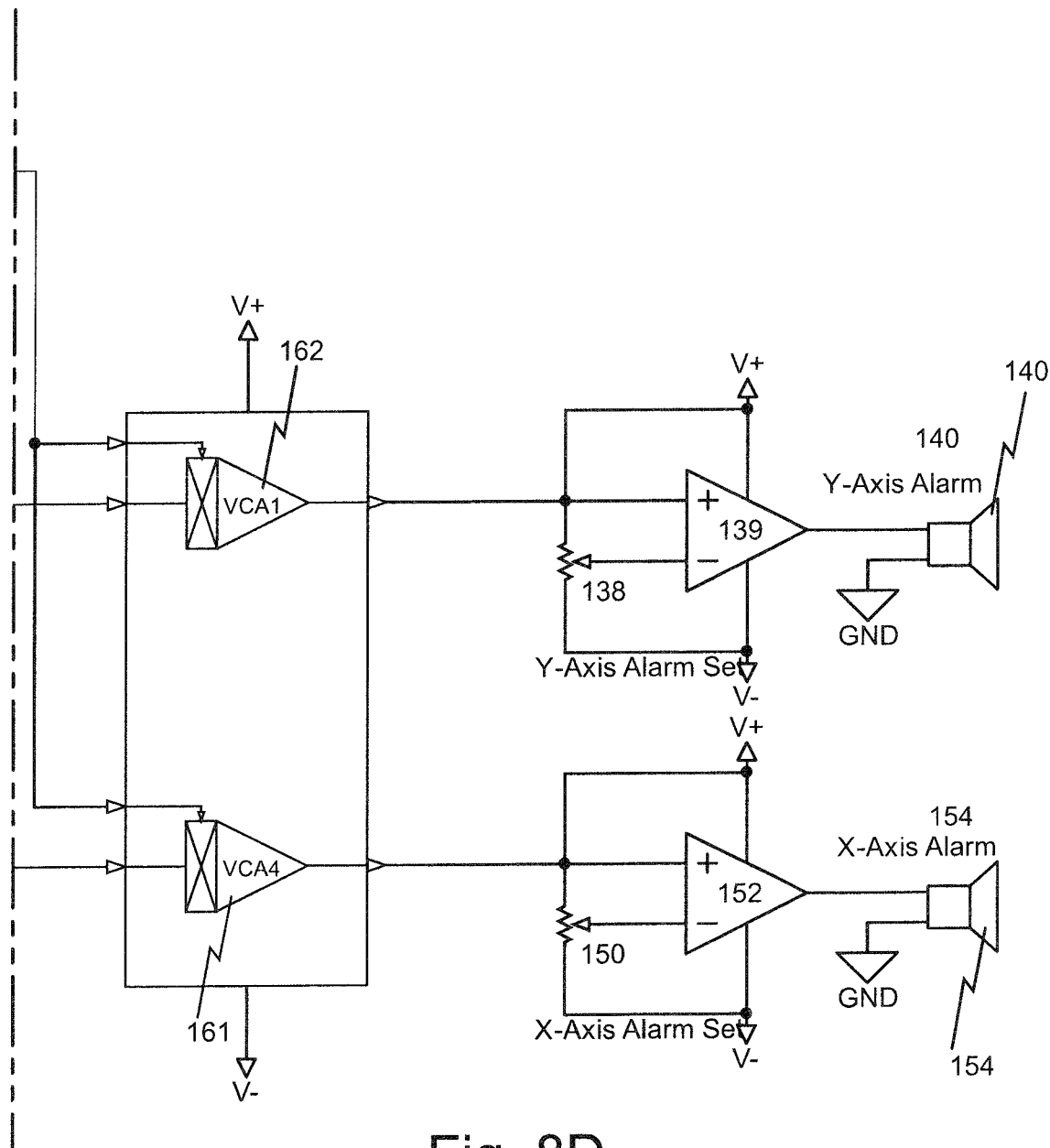

With reference to FIG. 7, a diagram is illustrated showing circuitry that calculates the weight and position of the center of gravity (eccentricity) of an object 89 on a surface 80, as shown in FIG. 6A. Outputs 110, 112, 114 and 116 from strain gauges 85, 86, 87, and 88 (FIG. 6A) may be assumed to have equal output and polarity for a given force. For the purpose of this discussion, the output from each strain gauge is assumed to be positive. The output from these strain gauge is summed in module 118 together with a tare input 120. For analog signals, module 118 can be a summing amplifier and tare adjustment 120 can be a potentiometer or the like to cancel the weight of bed and associated equipment. A patient's weight can be displayed on an indicating device such a digital display 122. Positive outputs 110 and 112 are summed with outputs 114 and 116 after outputs 114 and 116 are sent through inverting devices 124 and 126 in module 130 and displayed on a similar display 132 as the relative position along the longitudinal axis 94 (of FIG. 6A) of the weighing surface 80. The longitudinal axis will be the centerline of a bed if the bed is the weighing surface. Preferably, the weight of the weighing surface 80 is symmetrical around the longitudinal axis 94. If the weight is not symmetrical, a tare adjustment can be introduced upon initial set up as indicated by 134. The output from module 130 may also be sent to a circuit 136 that inverts negative signals to a positive signal. Such a circuit 136 is called full wave rectification in power supply circuits and can be simulated by operational amplifiers with diode feedback to improve linearity. In digital circuits, a value is sampled and if negative, its sign is inverted. In this manner, a patent's position on either side of a bed will indicate a positive signal when it is off the centerline in the longitudinal direction. It can be compared with a preset value. This is shown schematically as comparer 139 with set device 138 and sent to an alarm 140. The output is shown in FIG. 6B and FIG. 6C.

In a like manner, positive outputs 112 and 116 are summed with outputs 110 and 114 after outputs 112 and 116 are inverted in modules 126 and 144, along with a tare signal from tare device 144 if needed to correct the position of the neutral plane along the lateral axis 96 (see FIG. 6A). The output is displayed on indicator 146. The signal may also be rectified by circuit 148 and compared to a preset signal from set device 150 in comparer 152. The signal can operate alarm 154 or the signal may be combined with the alarm signal from 140 to operate a single alarm device.

It should be noted that when the signals are combined as described above, the object's weight is monitored in the longitudinal and lateral direction and the position can operate an alarm whenever its weight is displaced left or right of a longitudinal axis, or if above or below a lateral axis. If the alarm signal is divided by the weight signal derived from module 118, then a patient's position on the surface 80 can be indicated as unit or 1 when it is on the edge of the bed. This is achieved by linearly reducing (dividing) the output of the patient's position along the lateral axis by the absolute value of output of the patient's weight, producing a normalized output. Similarly, the patient's position along the longitudinal axis may be normalized. This can simplify setting of the alarm, since if it is desired to keep the patient in the center one half of the bed, the alarm may be set to 0.5 on a scale of 0 to 1. In many applications it may not be necessary to measure the weight deviation toward the top or bottom of the bed, thus summing module 130 may be omitted.

FIGS. 8A-8D are detailed electrical drawings illustrating a detailed circuit diagram, similar to FIG. 7, that calculates the weight and position of the center of gravity (eccentricity) of an object 89 on a surface 80 shown in FIG. 6A.

Figure 9:
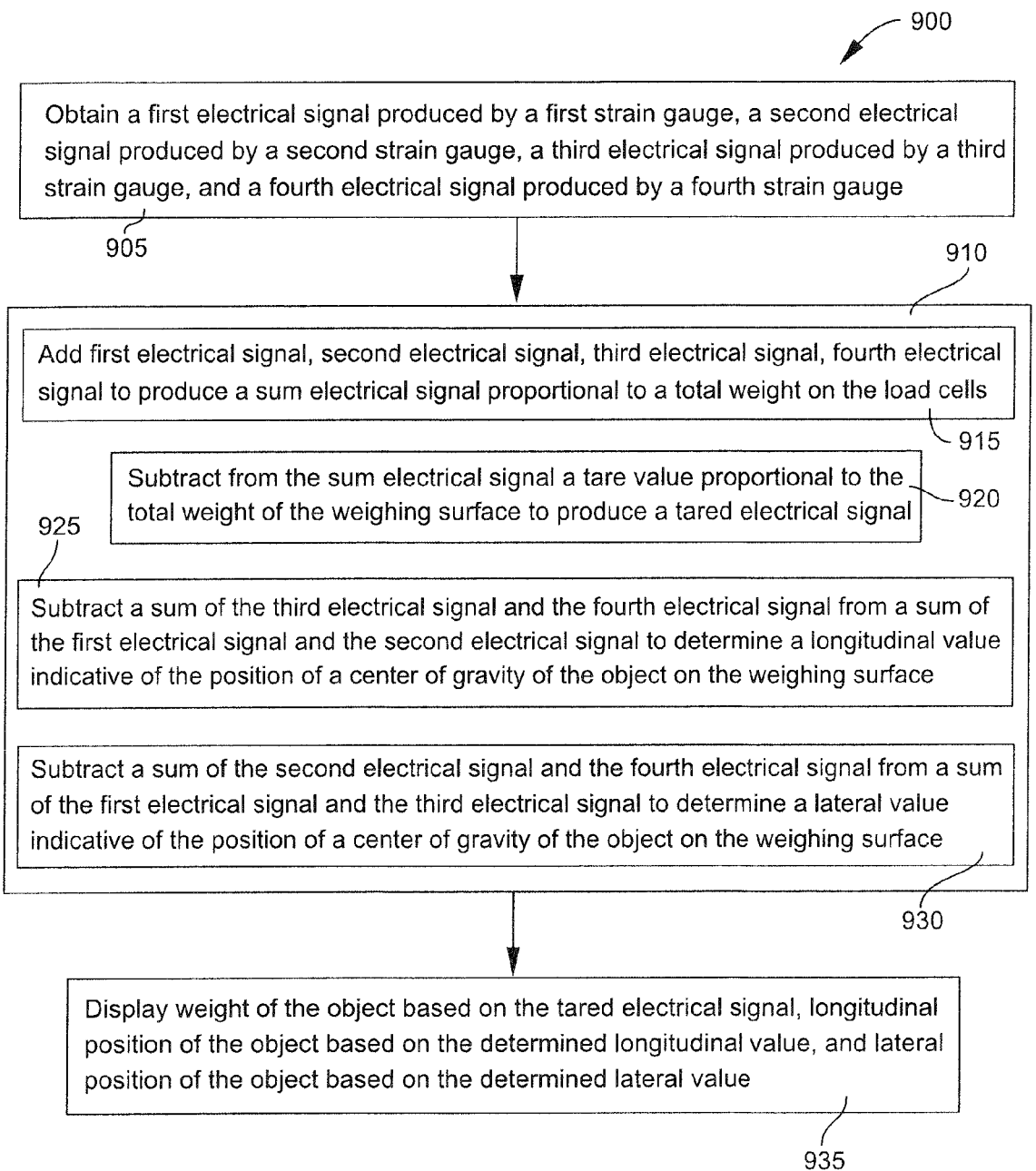
FIG. 9 is a flow diagram illustrating a method of determining weight and position of an object on a weighing surface, according to an example embodiment of the present invention.

FIG. 9 is a flow diagram illustrating a method 900 of determining weight and position of an object on a weighing surface, according to an example embodiment of the present invention. According to the method 900, the weighing surface has first, second, third, and fourth load cells with respective first, second, third, and fourth strain gauges, and where the strain gauges are configured to measure strain at the load cells caused by the object on the weighing surface. A first electrical signal produced by the first strain gauge, a second electrical signal produced by the second strain gauge, a third electrical signal produced by the third strain gauge, and a fourth electrical signal produced by the fourth strain gauge are obtained (905). The method involves simultaneously (910) adding the first electrical signal, second electrical, third electrical signal, and fourth electrical signal to produce a sum electrical signal proportional to a total weight on the load cells (915), and subtracting from the sum electrical signal a tare value proportional to the total weight of the weighing surface to produce a tared electrical signal (920). The method further involves simultaneously (910) subtracting a sum of the third electrical signal and the fourth electrical signal from a sum of the first electrical signal and the second electrical signal to determine a longitudinal value indicative of the position of a center of gravity of the object on the weighing surface (925). The method further involves simultaneously (910) subtracting a sum of the second electrical signal and the fourth electrical signal from a sum of the first electrical signal and the third electrical signal to determine a lateral value indicative of the position of a center of gravity of the object on the weighing surface (930). The method further involves displaying a weight of the object based on the tared electrical signal, a longitudinal position of the object based on the determined longitudinal value, and a lateral position of the object based on the determined lateral value (935).

While this invention has been particularly shown and described with references to example embodiments thereof, it will be understood by those skilled in the art that various changes in form and details may be made therein without departing from the scope of the invention encompassed by the appended claims.

What is claimed is:

1. A system for determining weight and position of an object on a weighing surface, the system comprising:
    first, second, third, and fourth load cells having respective first, second, third, and fourth strain gauges configured to measure strain at the load cells caused by the object on the weighing surface;
    circuitry configured to simultaneously determine weight and position of the object on the weighing surface by obtaining a first electrical signal produced by the first strain gauge, a second electrical signal produced by the second strain gauge, a third electrical signal produced by the third strain gauge, and a fourth electrical signal produced by the fourth strain gauge and simultaneously:
        adding the first electrical signal, the second electrical signal, the third electrical signal, and the fourth electrical signal, to produce a sum electrical signal proportional to a total weight on the load cells, and subtracting from the sum electrical signal a tare value proportional to the total weight of the weighing surface to produce a tared electrical signal;
        subtracting a sum of the third electrical signal and the fourth electrical signal from a sum of the first electrical signal and the second electrical signal to determine a longitudinal value indicative of the position of a center of gravity of the object on the weighing surface relative to the locations of the first and third load cells and relative to the locations of the second and fourth load cells; and
        subtracting a sum of the second electrical signal and the fourth electrical signal from a sum of the first electrical signal and the third electrical signal to determine a lateral value indicative of the position of a center of gravity of the object on the weighing surface relative to the locations of the first and second load cells and relative to the locations of the third and fourth load cells; and
    a display to report the weight of the object based on the tared electrical signal, a longitudinal position of the object based on the determined longitudinal value, and lateral position of the object based on the determined lateral value.

2. A system as in claim 1 further comprising an alarm configured to indicate if the object shifts to an unwanted position.

3. A system as in claim 2 wherein the alarm is triggered to indicate by comparing the determined longitudinal value to a longitudinal alarm value to determine whether the determined longitudinal value exceeds the longitudinal alarm value, the longitudinal alarm value being indicative of the object shifting to a an unwanted position.

4. A system as in claim 2 wherein the alarm is triggered to indicate by comparing the determined lateral value to a lateral alarm value to determine whether the determined lateral value exceeds the lateral alarm value, the lateral alarm value being indicative of the object shifting to an unwanted position.

5. A system as in claim 1 wherein the circuitry is further configured to normalize the longitudinal value by linearly reducing longitudinal value by the absolute value of tared electrical signal.

6. A system as in claim 1 wherein the circuitry is further configured to normalize the lateral value by linearly reducing lateral value by the absolute value of tared electrical signal.

7. A system as in claim 1 wherein the weighing surface is a hospital bed and wherein the object is a patient.

8. A method of determining weight and position of an object on a weighing surface having first, second, third, and fourth load cells with respective first, second, third, and fourth strain gauges configured to measure strain at the load cells caused by the object on the weighing surface, the method comprising:
    adding a first electrical signal produced by the first strain gauge, a second electrical signal produced by the second strain gauge, a third electrical signal produced by the third strain gauge, and a fourth electrical signal produced by the fourth strain gauge, to produce a sum electrical signal proportional to a total weight on the load cells;
    subtracting from the sum electrical signal a tare value proportional to the total weight of the weighing surface to produce a tared electrical signal;
    subtracting a sum of the third electrical signal and the fourth electrical signal from a sum of the first electrical signal and the second electrical signal to determine a longitudinal value indicative of the position of a center of gravity of the object on the weighing surface relative to the locations of the first and third load cells and relative to the locations of the second and fourth load cells;
    subtracting a sum of the second electrical signal and the fourth electrical signal from a sum of the first electrical signal and the third electrical signal to determine a lateral value indicative of the position of a center of gravity of the object on the weighing surface relative to the locations of the first and second load cells and relative to the locations of the third and fourth load cells;
    wherein the adding and subtracting to determine the tared electrical signal, longitudinal value, and lateral value occurs simultaneously; and
    displaying a weight of the object based on the tared electrical signal, displaying a longitudinal position of the object based on the determined longitudinal value, and displaying a lateral position of the object based on the determined lateral value.

9. A method as in claim 8 further comprising:
    comparing the determined longitudinal value to a longitudinal alarm value indicative of the object shifting to a an unwanted position; and
    indicating an alarm if the determined longitudinal value exceeds the longitudinal alarm value.

10. A method as in claim 8 further comprising:
    comparing the determined lateral value to a lateral alarm value indicative of the object shifting to an unwanted position; and
    indicating an alarm if the determined lateral value exceeds the lateral alarm value.

11. A method as in claim 8 further comprising normalizing the longitudinal value by linearly reducing longitudinal value by the absolute value of tared electrical signal.

12. A method as in claim 8 further comprising normalizing the lateral value by linearly reducing lateral value by the absolute value of tared electrical signal.

13. A method as in claim 8 wherein the weighing surface is a hospital bed and wherein the object is a patient.

14. A system for determining weight and position of an object on a weighing surface, the system comprising:
first and second load cells having respective first and second strain gauges configured to measure strain at the load cells caused by the object on the weighing surface;
circuitry configured to simultaneously determine weight and position of the object on the weighing surface by obtaining a first electrical signal produced by the first strain gauge, and a second electrical signal produced by the second strain gauge and simultaneously:
adding the first electrical signal and the second electrical signal to produce a sum electrical signal proportional to a total weight on the load cells, and subtracting from the sum electrical signal a tare value proportional to the total weight of the weighing surface to produce a tared electrical signal; and
subtracting the second electrical signal from the first electrical signal to determine a position value indicative of the position of a center of gravity of the object on the weighing surface relative to the locations of the first and second load cells; and
a display to report the weight of the object based on the tared electrical signal, and a position of the object based on the determined position value.

15. A system as in claim 14 further comprising an alarm configured to indicate if the object shifts to an unwanted position.

16. A system as in claim 15 wherein the alarm is triggered to indicate by comparing the determined position value to an alarm value to determine whether the determined position value exceeds the alarm value, the alarm value being indicative of the object shifting to an unwanted position.

17. A system as in claim 14 wherein the circuitry is further configured to normalize the position value by linearly reducing position value by the absolute value of tared electrical signal.

18. A system as in claim 14 wherein the weighing surface is a hospital bed and wherein the object is a patient.

* * * * *